United States Patent Office 3,562,202
Patented Feb. 9, 1971

1

3,562,202
CURING AN ALPHA-OLEFIN POLYMER WITH A QUINONE DIOXIME AND A ZINC SALT
Donald B. Smith, Reading, and James C. MacKenzie, Wellesley Hills, Mass., assignors, by mesne assignments, to Polymer Dispersions, Inc., New York, N.Y., a corporation of Ohio
No Drawing. Continuation-in-part of applications Ser. No. 767,776, Oct. 17, 1958, and Ser. No. 812,595, May 12, 1959. This application Dec. 26, 1962, Ser. No. 247,346
Int. Cl. C08f 1/84, 45/04
U.S. Cl. 260—41                           21 Claims This invention relates to polymeric compositions and in particular to novel heat curable polymeric compositions having improved properties.

Essentially saturated long chain high molecular weight organic polymers, notably those formed by the polymerization of mono-olefinic hydrocarbons such as ethylene, propylene and α-butylene (n-butene-1) have of late achieved considerable commercial importance. These polymeric materials are currently being extensively used as insulation for wire and cable, in conduits, in containers, etc. The fabrication, molding, extrusion, and calendering of these materials is readily accomplished by standard methods. Despite all this, however, the applications of these polymers are circumscribed by their lack of high temperature form stability, that is, their inability to retain a particular shape at elevated temperatures, by their solubility in certain solvents, and by their relatively poor resistance to environmental stress cracking.

This application is a continuation-in-part of copending applications Ser. Nos. 767,776, filed Oct. 17, 1958 and 812,595, filed May 12, 1959, both now abandoned. In our copending U.S. application Ser. No. 247,374 filed contemporaneously herewith, and now U.S. Pat. No. 3,264,-252, it is disclosed that the physical properties of such polymers can be greatly improved by the addition thereto of a minor amount, that is between about 0.1 and about 10% by weight of the polymer of a quinone oxime or a quinone oxime derivative such as p. quinone dioxime and diacetyl p. quinone dioxime and curing at a temperature above about 170° C. The hydrocarbon insolubility of the polymer is thereby greatly improved and the polymer has greatly increased resistance to creep and to stress cracking. When a filler such as carbon black is included, the tensile strength, yield strength, and temperature resistance of the polymer are also greatly increased.

The oximes and oxime derivatives contemplated by said aforementioned copending application are of the class of compounds having the formulation $R(NOR_1)_2$ in which R is an organic group having a quinoid structure and $R_1$ is hydrogen, a metal such as zinc or silver, or any organic grouping, for example, alkyl (such as methyl, tertiary butyl), aryl (such as phenyl), arylalkyl (such as cumyl), acyl (such as acetyl, lauroyl), or aroyl (such as benzoyl).

As stated above, the quinone oximes and their derivatives effect curing at temperatures above about 170° C. These curing temperatures are oftentimes, however, considerably higher than are most desirable for the processing of polymeric compositions such as polyethylene, polypropylene, etc. Such higher temperatures are somewhat more difficult to attain and in any case are more costly.

Accordingly, it is a principal object of the present invention to provide novel heat curable polymeric compositions.

Another object of this invention is to provide a process whereby polymeric compositions can be cured with quinone oximes and derivatives thereof at temperatures lower than was heretofore possible.

Other objects will in part be obvious and will in part appear hereinafter.

In accordance with the present invention, it was discovered that the aforesaid polymeric compositions can be cured with quinone oximes or quinone oxime derivatives at temperatures above about 145° C. and substantially below 170° C. in the presence of a minor amount, i.e. at least about 0.1% by weight of the total composition of a zinc salt, such as zinc stearate, zinc chloride and zinc acetate. There seems to be no critical upper limit as to the amounts of zinc salt that can be present although amounts larger than about 25% by weight of the total composition will seldom be used because of economic consideration as well as the fact that at higher loadings the characteristics of the polymeric compositions becomes increasingly affected.

From the unexpected results achieved by this invention, we postulate that zinc salts cause the quinone oximes and the derivatives thereof to decompose at temperatures lower (above about 145° C.) than that at which said oximes and derivatives normally decompose (above about 170° C.), thereby initiating cross linking between the polymer chains at temperatures lower than would normally be possible when utilizing the said oximes or derivatives thereof alone as the curing agents.

It is pointed out that the particular curing temperatures above about 145° C. that can be utilized in curing a particular polymeric composition to be cured. Thus, it has been found that normally elastomeric compositions, i.e. compositions that can be stretched at room temperature to at least twice their original length and, after having been stretched and the stress removed, return with force to approximately their original length in a short time, normally cure at temperatures as low as about 145°·C. On the other hand, it has been found that normally plastomeric compositions i.e. compositions that cannot be stretched at room temperature to at least twice their original length and, after having been stretched and the stress removed, return with force to approximately their original length in a short time, normally require temperatures above about 160° C. in order for substantial curing to occur.

In order to determine whether a particular composition was plastomeric or elastomeric, the following test was utilized:

One gram of the polymer or copolymer was shaken with 100 cc. of isooctane at 25° C. for seven days. At the end of that period, the weight of polymer that had dissolved was determined.

It was found that, in general, polymers and copolymers that were soluble to the extent of at least about 70% in the above test fulfilled the above definition of an elastomeric composition whereas polymers and copolymers that were soluble to the extent of less than about 70% fulfilled the above definition of a plastomeric composition.

Hereinafter follow a number of nonlimiting illustrative examples. Unless otherwise stated, the degree of insolubility of the cured compounds in the following examples was the percentage of the polymer which remained undissolved after being extracted in diethylbenzene at 110° C. for twice the period of time necessary to completely dissolve the unmodified polymer. The degree of insolubility is accordingly regarded as being a substantially accurate measure of the extent of curing that has taken place.

EXAMPLE 1

A plastomeric composition comprising 100 parts by weight of "Alathon 10," a polyethylene polymer having a density of 0.92 and yield and tensile strengths at room temperature of about 1700 lbs./in.$^2$, produced by E. I. du Pont de Nemours and Co., 3 parts by weight of dibenzoyl p. quinone dioxime and 3 parts by weight of zinc chloride was cured for 10 minutes at 180° C. The resulting cured composition was found to be 72% insoluble. The same composition lacking only the zinc chloride when cured under the same conditions was found to be 100% soluble.

EXAMPLE 2

A plastomeric composition comprising by weight 100 parts of "Alathon 10," 2 parts of dibenzoyl p. quinone dioxime, and 2 parts of zinc stearate was cured for 15 minutes at 182° C. The resulting compound was 82% insoluble. The same composition lacking only the zinc stearate when cured under the same conditions was found to be 100% soluble.

EXAMPLE 3

A plastomeric composition comprising by weight 100 parts of "Alathon 10," 2 parts of dibenzoyl p. quinone dioxime and 4 parts of zinc stearate was cured at 180° C. for 10 minutes. The resulting cured compound was found to be 76% insoluble. The same composition cured at 150° C. for 10 minutes was 100% soluble.

EXAMPLE 4

A plastomeric composition comprising by weight 100 parts of "Alathon 10," 100 parts medium thermal carbon black, 2 parts of dibenzoyl p. quinone dioxime and 2 parts zinc stearate was cured for 10 minutes at 180° C. The resulting cured composition was 66% insoluble. The same composition when cured for 10 minutes at 151° C. was 100% soluble. Also, the same composition lacking only the zinc stearate when cured for 10 minutes at 180° C. was 100% soluble.

EXAMPLE 5

A plastomeric composition comprising by weight 100 parts of "Alathon 10," 2 parts dibenzoyl p. quinone dioxime and 2 parts zinc stearate was cured for 10 minutes at 180° C. The resulting cured composition was 82% insoluble. The same composition cured under the same conditions at 150° C. was 100% soluble.

EXAMPLE 6

A plastomeric composition comprising by weight 100 parts of "Alathon 10," 100 parts of medium thermal carbon black, 2 parts dibenzoyl p. quinone dioxime and 2 parts zinc stearate was cured for 10 minutes at 180° C. The resulting cured composition was 66% insoluble. The same composition cured for 10 minutes at 200° C. was 73% insoluble. The same composition cured for 10 minutes at 150° C. was 100% soluble.

EXAMPLE 7

A plastomeric composition comprising by weight 100 parts of "Marlex 50," a high density polyethylene polymer produced by Phillips Petroleum Co., having a density of about 0.96, 100 parts medium thermal carbon black, 2 parts dibenzoyl p. quinone dioxime, and 2 parts zinc stearate was cured for 15 minutes at 180° C. The resulting cured composition was 32% insoluble.

EXAMPLE 8

A plastomeric composition comprising by weight 100 parts of "Alathon 10," 2 parts of p. quinone dioxime and 6.7 parts of zinc stearate was cured for 10 minutes at 180° C. The resulting composition was 32% insoluble. The same composition cured for 10 minutes at 225° C. was 43% insoluble.

EXAMPLE 9

An elastomeric composition comprising 100 parts by weight atactic poly-α-butylene produced by polymerizing α-butylene at a temperature of about 50° C. with a Ziegler-type catalyst comprising aluminum triisobutyl and titanium tetrachloride, 5 parts p. quinone dioxime and 5 parts zinc stearate was cured for 10 minutes at 180° C. The resulting composition was 20% insoluble.

EXAMPLE 10

A plastomeric composition comprising 100 parts "Alathon 10," 2 parts of the di-silver salt of p. quinone dioxime and 2 parts zinc stearate was cured for 10 minutes at 180° C. The resulting composition was 80% insoluble.

EXAMPLE 11

A plastomeric composition comprising 100 parts "Alathon 10," and 2 parts of the zinc salt of p. quinone dioxime was cured for 10 minutes at 180° C. The resulting composition was 100% soluble.

EXAMPLE 12

A plastomeric composition comprising 100 parts "Alathon 10," 2 parts of dibenzoyl p. quinone dioxime, and 0.5 part of zinc stearate was cured for 10 minutes at 180° C. The resulting composition was 38.1% insoluble.

EXAMPLE 13

A plastomeric composition comprising 100 parts "Alathon 10," 2 parts dibenzoyl p. quinone dioxime, and 10 parts zinc stearate was cured for 10 minutes at 180° C. The resulting composition was 81.3% insoluble. The same composition cured for 10 minutes at 169° C. was 10.1% insoluble.

EXAMPLE 14

A plastomeric composition comprising 100 parts "Alathon 10," 2 parts dibenzoyl p. quinone dioxime, and 15 parts zinc stearate was cured for 10 minutes at 180° C. The resulting composition was 76.2% insoluble.

EXAMPLE 15

An elastomeric composition comprising by weight 100 parts of poly α-butylene produced by polymerizing α-butylene at a temperature of about 50° C. with a Ziegler-type catalyst comprising aluminum triisobutyl and titanium tetrachloride, 5 parts p. quinone dioxime and 5 parts zinc stearate was cured for 15 minutes at 165° C. The resulting compound was found to be 20% insoluble.

EXAMPLE 16

An elastomeric composition comprising by weight 100 parts of a highly attractive copolymer of ethylene and propylene, 50 parts of "Vulcan 3," 2 parts of zinc benzoate and 5 parts of dibenzoyl 1,4-naphthoquinone dioxime was cured for 15 minutes at 165° C. The resulting compound was found to be 25.4% insoluble.

EXAMPLE 17

An elastomeric composition comprising by weight 100 parts of a polymer of α-butylene which was produced by polymerizing α-butylene at a temperature of about 50° C. with a Ziegler-type catalyst comprising titanium tetrachloride and aluminum triethyl, 5 parts of dibenzoyl p. quinone dioxime and 5 parts of zinc stearate was cured for 15 minutes at 165° C. The resulting compound was found to be 27.2% insoluble.

EXAMPLE 18

An elastomeric composition comprising 100 parts of a polymer of α-butylene which was produced by polymerizing α-butylene at a temperature of about 50° C. with a Ziegler-type catalyst comprising titanium tetrachloride and aluminum triethyl, 2 parts of zinc stearate and 5 parts of dibenzoyl p. quinone dioxime was cured for 10 minutes at 165° C. The resulting compound was found to be 18.2% insoluble.

EXAMPLE 19

An elastomeric composition comprising 100 parts of a copolymer of ethylene and α-butylene comprising 40% ethylene by weight which copolymer was produced by copolymerizing ethylene and α-butylene at a temperature of about 70° C. with a Ziegler-type catalyst comprising titanium tetrachloride and aluminum triethyl, 2 parts of zinc stearate and 5 parts of dibenzoyl p. quinone dioxime was cured in the press for 15 minutes at 165° C. The resulting compound was found to be 32.5% insoluble.

As previously mentioned, the physical properties of the above discussed polymeric compositions greatly improved when a filler or pigment is utilized. The preferred filler is carbon black but other fillers such as finely-divided metal and metalloid oxides, metal silicates, wood flour, and many others are also suitable for the purposes of the instant invention.

It should be pointed out that the quinone oximes and their derivatives are particularly suitable for the strengthening of certain polymeric compositions, for example, of α-butylene and propylene which are subject to scorch and premature cure when cured with conventional curing agents. Many of the curing agents that were known heretofore, such as the aralkyl peroxides, decompose at temperatures sufficiently high to allow their being milled into most polymeric compositions without effecting premature and therefore nonuniform curing. However, these curing agents are not suitable for use with certain polymeric compositions that are particularly subject to scorch. The quinone dioximes and derivatives thereof in the presence of the zinc salts of the present invention, however, normally effect curing only at temperatures above about 145° C. in the case of elastomeric materials and 160° C. in the case of plastomeric materials. Accordingly, the curing agents of the present invention are completely suitable for use in the curing of all the polymeric compositions of the present invention.

Also, the curing agents of the present invention have in at least one other very important aspect a definite advantage over prior art curing agents. When polymeric compositions are extruded in conventional extruding apparatus, for example, in the production of cured tubing, the rate of extrusion is very highly dependent upon the viscosity of the composition being extruded. Accordingly, heretofore, extrusion rates were distinctly limited because, due to the low decomposition temperature of many of the prior art curing agents, the temperature of the molten composition could not be increased substantially (and the viscosity accordingly lowered) without causing premature curing of the composition in the extruder. By the use of the curing agents of the present invention, however, this severe limitation is completely overcome because the curing agents of the present invention can be heated to substantially higher temperatures (i.e., above about 145° C. or 160° C.) before undergoing decomposition. Accordingly, extrusion rates can be greatly increased.

Obviously many changes may be made in the above specifically disclosed formulations without departing from the scope of the invention. For example, in addition to those oximes expressly mentioned above as being suitable, many others such as p. quinone dioxime diphenyl ether, dimethyl p. quinone dioxime, diphenyl p. quinone dioxime, aluminim salt of p. quinone dioxime, p. quinone dioxime dimethyl ether, di-p-toluoyl quinone 1,4-dioxime and diacetyl p. quinone dioxime are also suitable.

Also, compounds which can be transformed in situ to quinone dioximes or their derivatives would also be suitable for the practice of the present invention. Accordingly, it is intended that such compounds be included within the scope of the appended claims.

Also, in addition to those zinc salts expressly mentioned above, many others, such as zinc undecylanate, zinc acetate and zinc propionate, are also suitable.

In addition to polyethylene, polypropylene, and poly α-butylene, other mono-olefinic polymers and copolymers and mixtures thereof, can also be utilized in the practice of this invention.

Therefore, it is intended that the disclosure of specific materials be regarded as illustrative and as in no way limiting the scope of this invention.

What we claim is:

1. A process for improving the high temperature properties of a polymeric material chosen from the group consisting of the homo-polymers of the aliphatic monoolefinic hydrocarbon monomers and mixtures thereof, copolymers formed from the aliphatic mono-olefinic hydrocarbons, and mixtures thereof, so as to produce a material having exceptional flexibility and strength, which process comprises compounding said polymeric material with a curing agent comprising between about 0.1 and 25% by weight of said polymeric material of a zinc salt chosen from the group consisting of zinc salts of carboxylic acids and zinc salts of inorganic acids, and above about 0.1% by weight of said polymeric material of a compound having the formulation $$R(NOR_1)_2$$

wherein R is an organic group having a quinoid structure, and $R_1$ is chosen from the group consisting of hydrogen, a metal which permits curing activity by said compound upon heating, and an organic grouping chosen from the group consisting of alkyl, aryl, arylalkyl, acyl, or aroyl, and curing the resulting mixture at a temperature above about 160° C.

2. The process of claim 1 wherein said polymeric material comprises polypropylene.

3. The process of claim 1 wherein said polymeric material comprises polyethylene.

4. The process of claim 1 wherein said polymeric material comprises poly α-abutylene.

5. The process of claim 1 wherein said compound having the formulation $$R(NOR_1)_2$$

comprises a compound chosen from the group consisting of p. quinone dioxime, dibenzoyl p. quinone dioxime, dibenzoyl 1,4 naphthoquinone dioxime, p. quiinone dioxime dimethyl ether, diacetyl p. quinone dioxime, the di-silver salt of p. quinone dioxime, the zinc salt of p. quinone dioxime, and di-p-toluoyl quinone 1,4-dioxime.

6. The process of claim 1 wherein said compound having the formulation $$R(NOR_1)_2$$

is dibenzoyl p. quinone dioxime.

7. The process of claim 1 wherein said zinc salt is chosen from the group consisting of zinc stearate, zinc chloride, zinc acetate, zinc propionate, zinc benzoate and mixtures thereof.

8. The process of claim 1 wherein said polymeric material is elastomeric.

9. The process of claim 1 wherein said polymeric material is plastomeric.

10. A process for improvig the high temperature properties of a polymeric material chosen from the group consisting of the homopolymers of the aliphatic monoolefinic hydrocarbon monomers and mixtures thereof, copolymers formed from the aliphatic mono-olefinic hydrocarbons, and mixtures thereof, so as to produce a material having exceptional flexibility and strength, which process comprises compounding said polymeric material with a filler and a curing agent comprising between about 0.1 and about 25% by weight of said polymeric material of a zinc salt chosen from the group consisting of zinc salts of carboxylic acidh and zinc salts of inorganic acids, and above about 0.1% by weight of said polymeric material of a compound having the formulation $$R(NOR_1)_2$$

wherein R is an organic group having a quinoid structure, and $R_1$ is chosen from the group consisting of hydrogen, a metal which permits curing activity by said compound upon heating, and an organic grouping chosen from the group consisting of alkyl, aryl, arylalkyl, acyl, or arol, and curing the resulting mixture at a temperature above about 160° C.

11. The process of claim 10 wherein said filler comprises carbon black.

12. The process of claim 10 wherein said compound having the formulation $$R(NOR_1)_2$$

comprises a compound chosen from the group p. quinone dioxime, dibenzoyl p. quinone dioxime, p. quinone dioxime dimethyl ether, dibenzoyl 1,4 naphthoquinone dioxime, diacetyl p. quinone dioxime, the di-silver salt of p. quinone dioxime, the zinc salt of p. quinone dioxime, and di-p-toluoyl quinone 1,4-dioxime.

13. The process of claim 10 wherein said compound conforming to the formula $$R(NOR_1)_2$$

is p. quinone dioxime.

14. The process of claim 10 wherein said compound conforming to the formula $$R(NOR_1)_2$$

is dibenzoyl p. quinone dioxime.

15. The process of claim 10 wherein said zinc salt is chosen from the group consisting of zinc stearate, zinc chloride, zinc acetate, zinc propionate, zinc benzoate and mixtures thereof.

16. The process of claim 10 wherein said polymeric material comprises polyethylene.

17. The process of claim 10 wherein said polymeric material comprises polypropylene.

18. The process of claim 10 wherein said polymeric material comprises poly α-butylene.

19. The process of claim 10 wherein said polymeric material is elastomeric.

20. The process of claim 10 wherein said polymeric material is plastomeric.

21. The method of curing polymeric material selected from the group consisting of the homopolymers of the aliphatic olefinic hydrocarbon monomers and mixtures thereof, copolymers formed from the aliphatic olefinic hydrocarbons and mixtures thereof comprising mixing together 100 parts by weight of polymeric material above about 0.1 part per 100 parts of said polymeric material by weight of a curing agent of the general formula

wherein R is a member of the group consisting of benzoate, acetate and laurate and .1 to 25 parts per 100 of said polymeric material of zinc chloride and thereafter heating the resulting mixture above 160° C. to effect curing of said polymeric material.

References Cited
UNITED STATES PATENTS

| | | | |
|---|---|---|---|
| 3,226,356 | 12/1965 | Kehr et al. | 260—41 |
| 2,748,104 | 5/1956 | Viohl | 260—41 |
| 3,012,020 | 12/1961 | Kirk et al. | 260—41 |
| 3,093,614 | 6/1963 | MacKenzie et al. | 260—41 |

ALLAN LIEBERMAN, Primary Examiner

U.S. Cl. X.R.
260—93.7, 94.9